United States Patent
Langer

(10) Patent No.: US 12,203,579 B2
(45) Date of Patent: Jan. 21, 2025

(54) FLUID HANDLING COUPLINGS

(71) Applicant: Colder Products Company, Roseville, MN (US)

(72) Inventor: Elizabeth J. Langer, Minneapolis, MN (US)

(73) Assignee: Colder Products Company, Roseville, MN (US)

( * ) Notice: Subject to any disclaimer, the term of this patent is extended or adjusted under 35 U.S.C. 154(b) by 0 days.

(21) Appl. No.: 17/969,184

(22) Filed: Oct. 19, 2022

(65) Prior Publication Data

US 2024/0133500 A1 Apr. 25, 2024
US 2024/0230001 A9 Jul. 11, 2024

Related U.S. Application Data

(63) Continuation of application No. 17/509,412, filed on Oct. 25, 2021, now Pat. No. 11,480,280.

(60) Provisional application No. 63/114,053, filed on Nov. 16, 2020.

(51) Int. Cl.
*F16L 37/34* (2006.01)
*F16L 37/084* (2006.01)
*F16L 37/12* (2006.01)

(52) U.S. Cl.
CPC .......... *F16L 37/34* (2013.01); *F16L 37/0841* (2013.01); *F16L 37/12* (2013.01)

(58) Field of Classification Search
CPC ........ F16L 37/34; F16L 37/32; F16L 37/0841
See application file for complete search history.

(56) References Cited

U.S. PATENT DOCUMENTS

| | | | |
|---|---|---|---|
| 1,210,090 A | 12/1916 | Markham |
| 1,605,399 A | 11/1926 | Guido |
| 1,753,024 A | 4/1930 | Rode |
| 2,679,860 A | 6/1954 | Diebold |
| 2,710,022 A | 6/1955 | Gibbs |
| 2,713,349 A | 7/1955 | Gibbs |
| 2,722,943 A | 11/1955 | Reinecke |
| 2,918,053 A | 12/1959 | Epstein |
| 2,959,196 A | 11/1960 | Truesdell et al. |
| 2,962,303 A | 11/1960 | Ramberg et al. |

(Continued)

FOREIGN PATENT DOCUMENTS

JP 1996-326978 12/1996

OTHER PUBLICATIONS

International Search Report and Written Opinion in International Appln. No. PCT/US2021/056431, dated Jan. 26, 2022, 12 pages.

(Continued)

*Primary Examiner* — David Colon-Morales
(74) *Attorney, Agent, or Firm* — Fish & Richardson P.C.

(57) ABSTRACT

Fluid couplings described herein are designed to prevent spillage of fluid when connecting and disconnecting the couplings. In some embodiments, the fluid couplings described herein include internal valve components. In some example embodiments, the internal valve components include two springs that are arranged to exert their spring forces in parallel with each other to bias a valve component to a normally closed position. Some embodiments include a single spring. In particular embodiments, components of the fluid couplings and fluid flow paths of the fluid couplings have oblong transverse cross-sectional shapes.

17 Claims, 14 Drawing Sheets

(56) References Cited

U.S. PATENT DOCUMENTS

| | | | |
|---|---|---|---|
| 3,065,002 A | 11/1962 | Waalkes et al. | |
| 3,095,011 A | 6/1963 | Banker | |
| 3,645,294 A * | 2/1972 | Allread | F16L 37/34 |
| | | | 137/614 |
| 3,904,175 A | 9/1975 | Deschenes | |
| 4,193,580 A | 3/1980 | Norris et al. | |
| 4,280,601 A | 7/1981 | Patriquin | |
| 4,327,770 A * | 5/1982 | Brown | F16L 37/34 |
| | | | 251/149.8 |
| 4,436,125 A | 3/1984 | Blenkush | |
| 4,753,268 A | 6/1988 | Palau | |
| 4,982,736 A | 1/1991 | Schneider | |
| 4,982,761 A | 1/1991 | Kreczko et al. | |
| 4,991,627 A * | 2/1991 | Nix | F16D 48/02 |
| | | | 285/319 |
| 5,135,024 A | 8/1992 | LeBlanc et al. | |
| 5,316,041 A | 5/1994 | Ramacier et al. | |
| 5,426,842 A | 6/1995 | DeBoalt et al. | |
| 5,494,073 A | 2/1996 | Saito | |
| 5,494,074 A | 2/1996 | Ramacier et al. | |
| 5,546,985 A * | 8/1996 | Bartholomew | F16L 37/34 |
| | | | 251/149.6 |
| 5,716,081 A | 2/1998 | Leigh-Monstevens et al. | |
| 5,845,943 A | 12/1998 | Ramacier et al. | |
| 5,911,403 A | 6/1999 | deCler et al. | |
| 6,024,124 A | 2/2000 | Braun et al. | |
| 6,029,701 A | 2/2000 | Chaffardon et al. | |
| 6,079,432 A | 6/2000 | Paradis | |
| 6,082,401 A | 7/2000 | Braun et al. | |
| 6,161,578 A * | 12/2000 | Braun | F16L 37/35 |
| | | | 137/614.04 |
| 6,231,089 B1 | 5/2001 | deCler et al. | |
| 6,302,147 B1 | 10/2001 | Rose et al. | |
| 6,328,348 B1 * | 12/2001 | Cornford | F16L 37/34 |
| | | | 285/305 |
| 6,357,802 B1 | 3/2002 | Nozato et al. | |
| 6,536,467 B2 | 3/2003 | Wu et al. | |
| 6,649,829 B2 | 11/2003 | Garber et al. | |
| 6,866,064 B2 * | 3/2005 | Nanni, Jr. | F16L 37/0887 |
| | | | 137/15.09 |
| 7,044,161 B2 | 5/2006 | Tiberghien | |
| 7,191,798 B2 | 3/2007 | Edelman et al. | |
| 7,343,931 B2 | 3/2008 | Packham | |
| 7,469,472 B2 * | 12/2008 | deCler | F16L 37/34 |
| | | | 285/285.1 |
| 7,631,660 B2 | 12/2009 | deCler et al. | |
| D612,019 S | 3/2010 | Williams et al. | |
| 7,806,139 B2 | 10/2010 | Packham et al. | |
| 8,256,459 B2 | 9/2012 | Tesluk et al. | |
| 8,397,756 B2 | 3/2013 | Packham et al. | |
| 8,973,896 B2 | 3/2015 | Tiberghien et al. | |
| 9,464,741 B2 | 10/2016 | Lewis et al. | |
| 9,534,721 B2 | 1/2017 | Lombardi | |
| 10,151,409 B2 | 12/2018 | Johnson et al. | |
| 10,711,930 B2 | 7/2020 | Lewis et al. | |
| 10,883,613 B2 | 1/2021 | Calderwood | |
| 10,941,551 B2 | 3/2021 | Arndt et al. | |
| 10,975,982 B2 | 4/2021 | Wilhelm | |
| 11,060,650 B2 | 7/2021 | Vranish | |
| 11,092,985 B1 * | 8/2021 | Handley | G01F 15/005 |
| 11,480,280 B2 * | 10/2022 | Langer | F16L 37/0841 |
| 11,711,907 B2 * | 7/2023 | Franz | H05K 7/20272 |
| | | | 137/334 |
| 2007/0025811 A1 | 2/2007 | Wilhelm | |
| 2009/0159825 A1 | 6/2009 | Trimborn et al. | |
| 2009/0188575 A1 | 7/2009 | Williams et al. | |
| 2014/0261819 A1 * | 9/2014 | Vranish | F16L 27/073 |
| | | | 137/798 |
| 2017/0009920 A1 | 1/2017 | Canatella | |
| 2018/0209573 A1 | 7/2018 | Tiberghien et al. | |
| 2018/0238480 A1 | 8/2018 | Scott et al. | |
| 2020/0370687 A1 | 11/2020 | Taylor | |
| 2021/0148499 A1 * | 5/2021 | Nick | F16L 37/34 |
| 2021/0199223 A1 | 7/2021 | Langer | |
| 2021/0360824 A1 | 11/2021 | Franz et al. | |
| 2021/0381606 A1 | 12/2021 | Fischer et al. | |
| 2022/0154864 A1 | 5/2022 | Langer | |

OTHER PUBLICATIONS

Extended European Search Report in European Appln No. 21892558.4 dated Mar. 15, 2024, 10 pages.

* cited by examiner

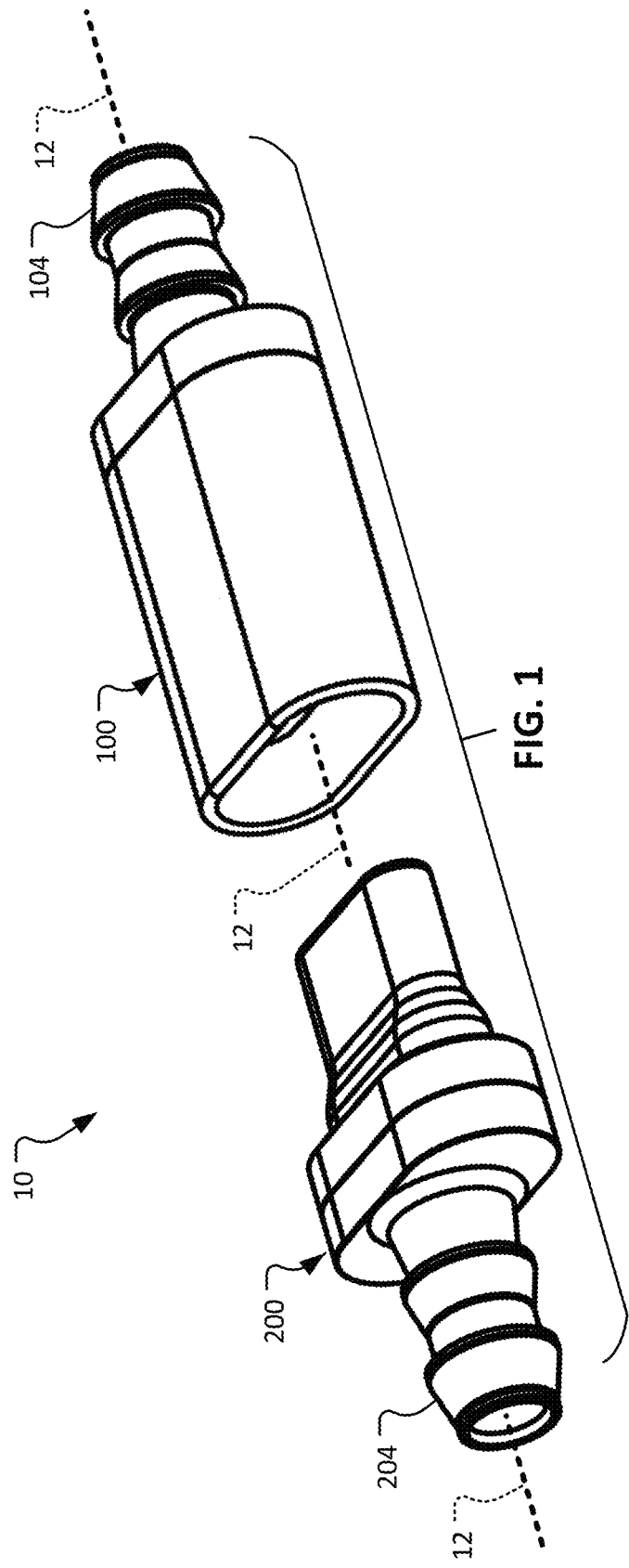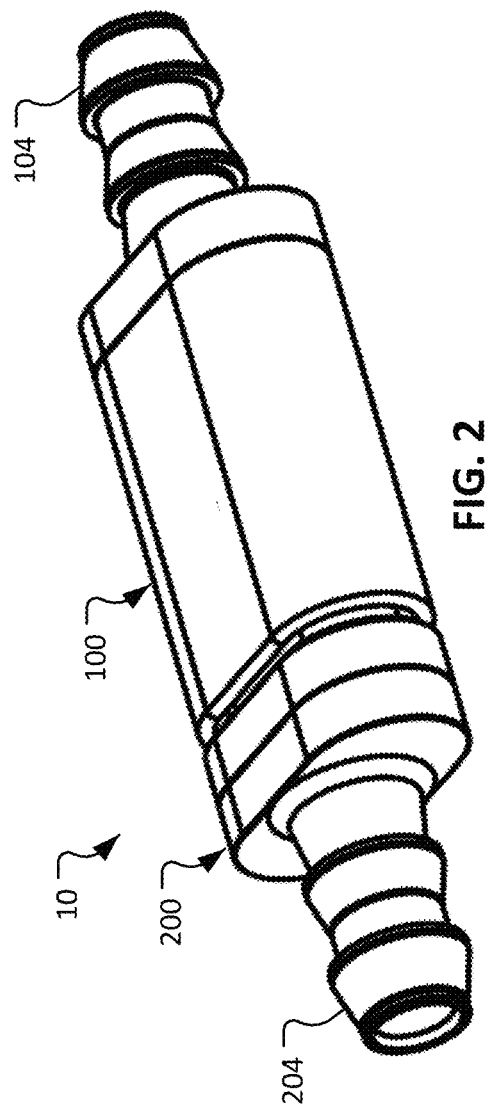

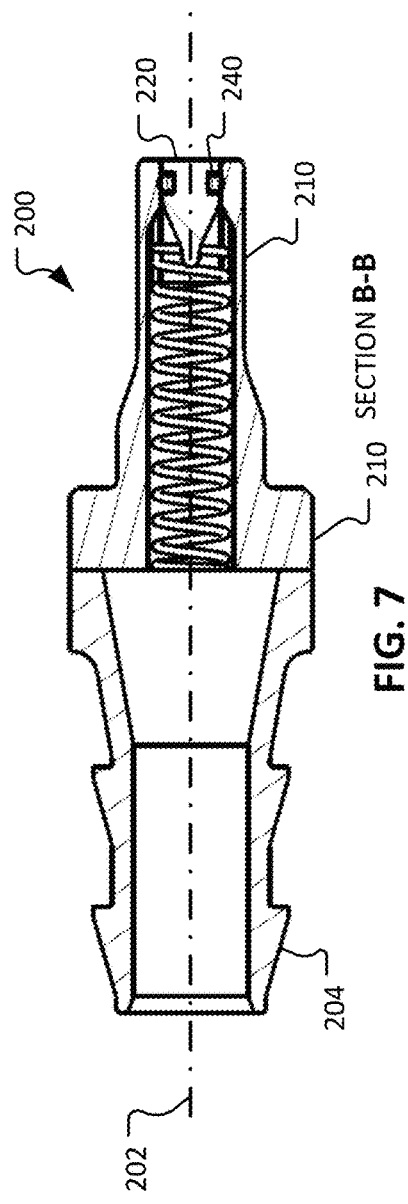
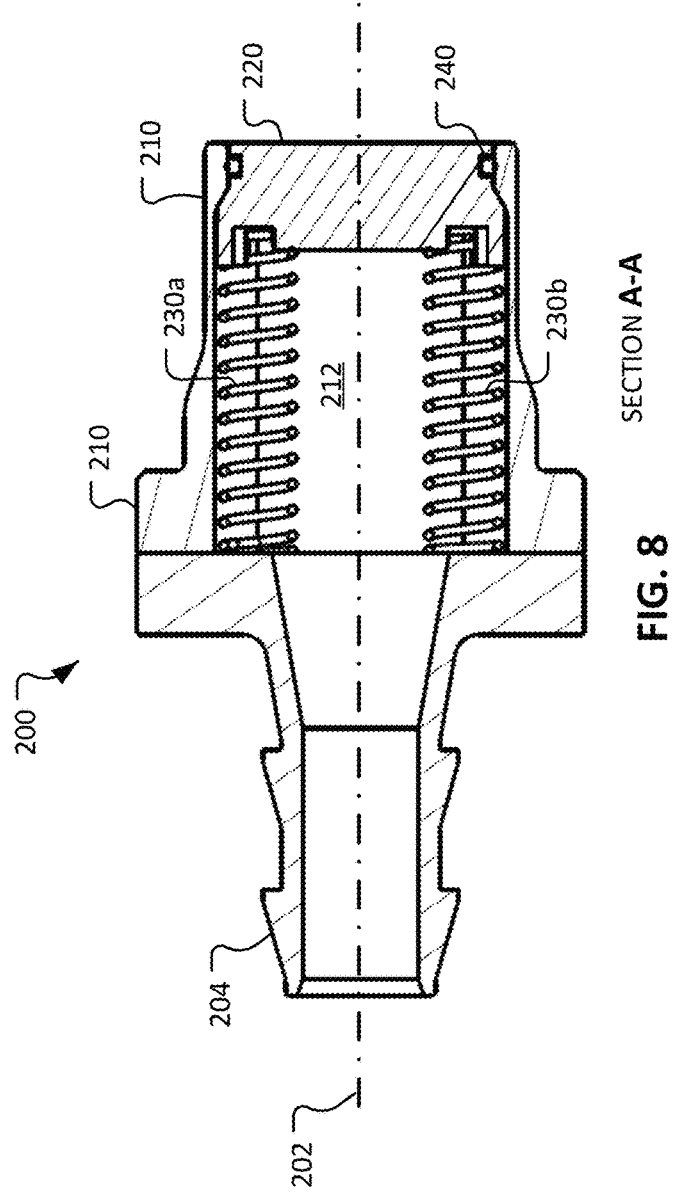

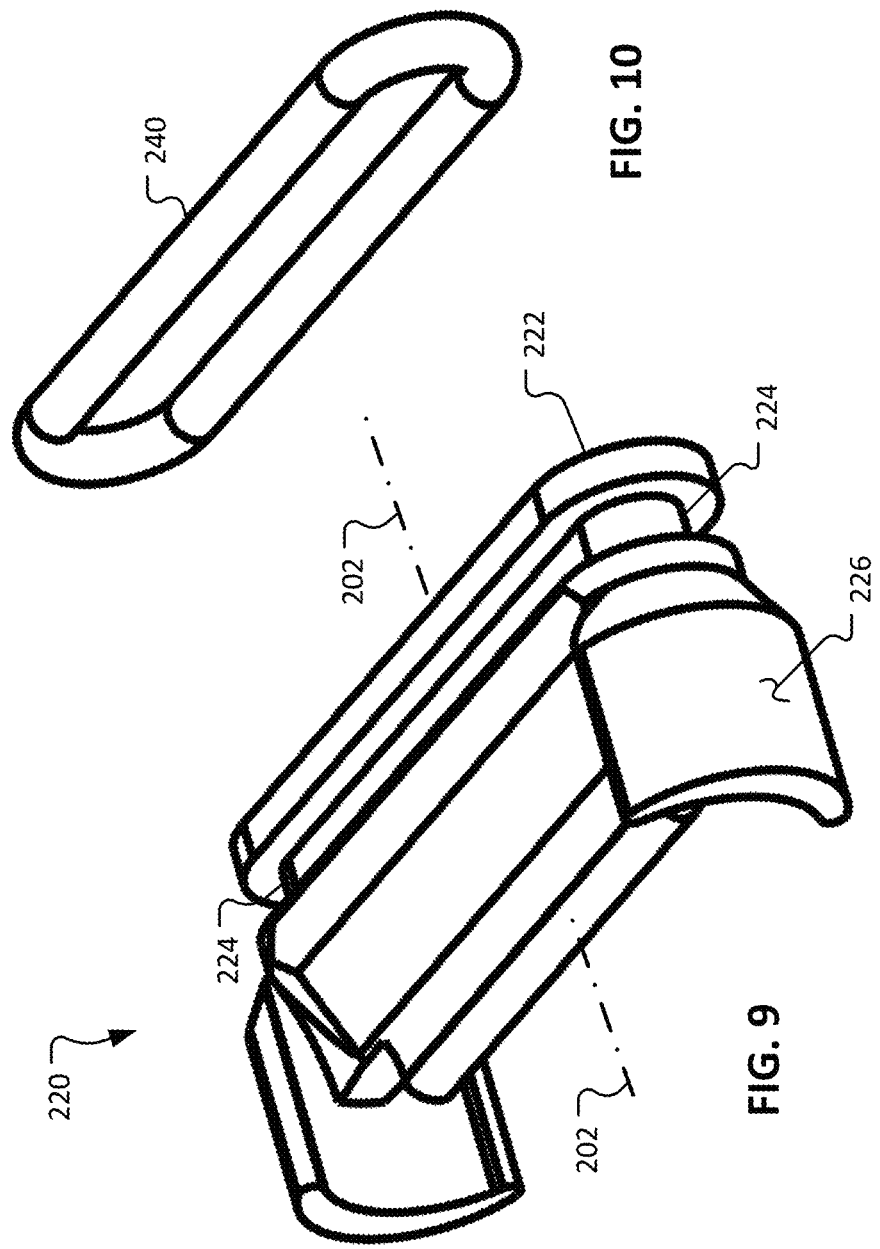

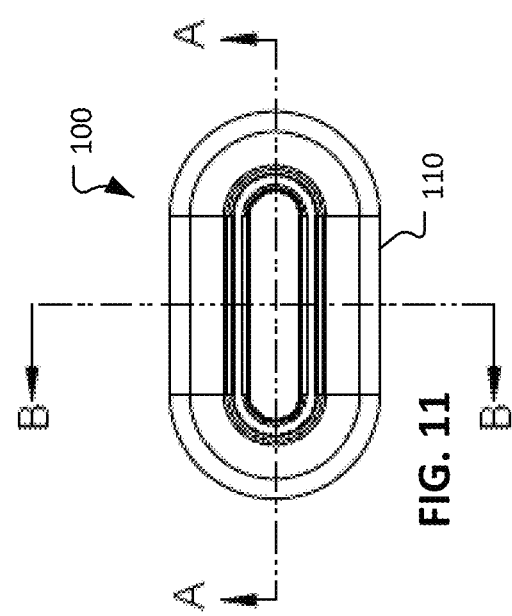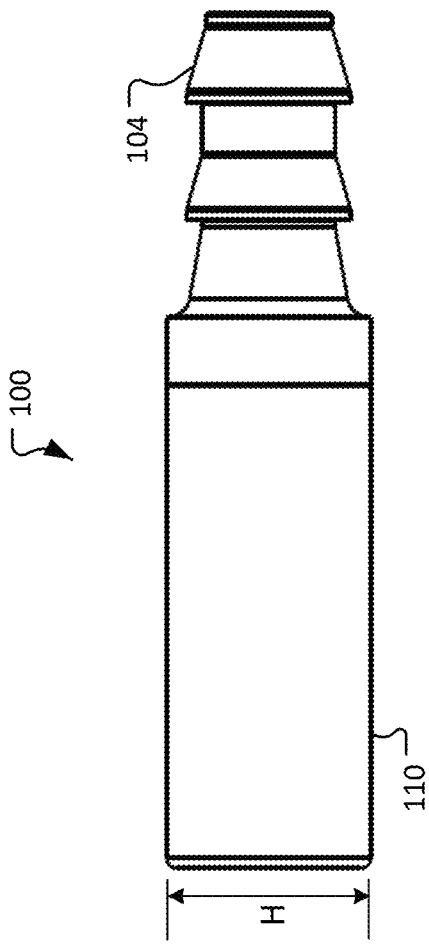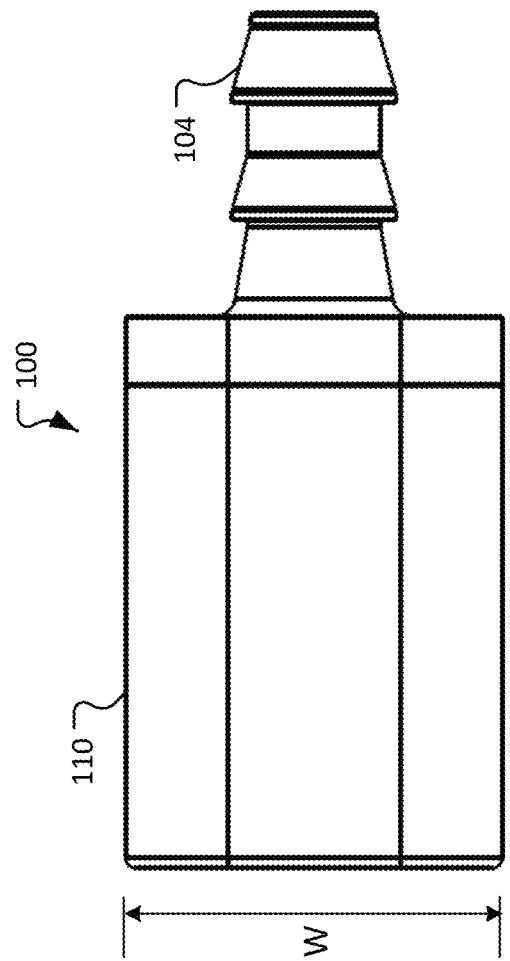

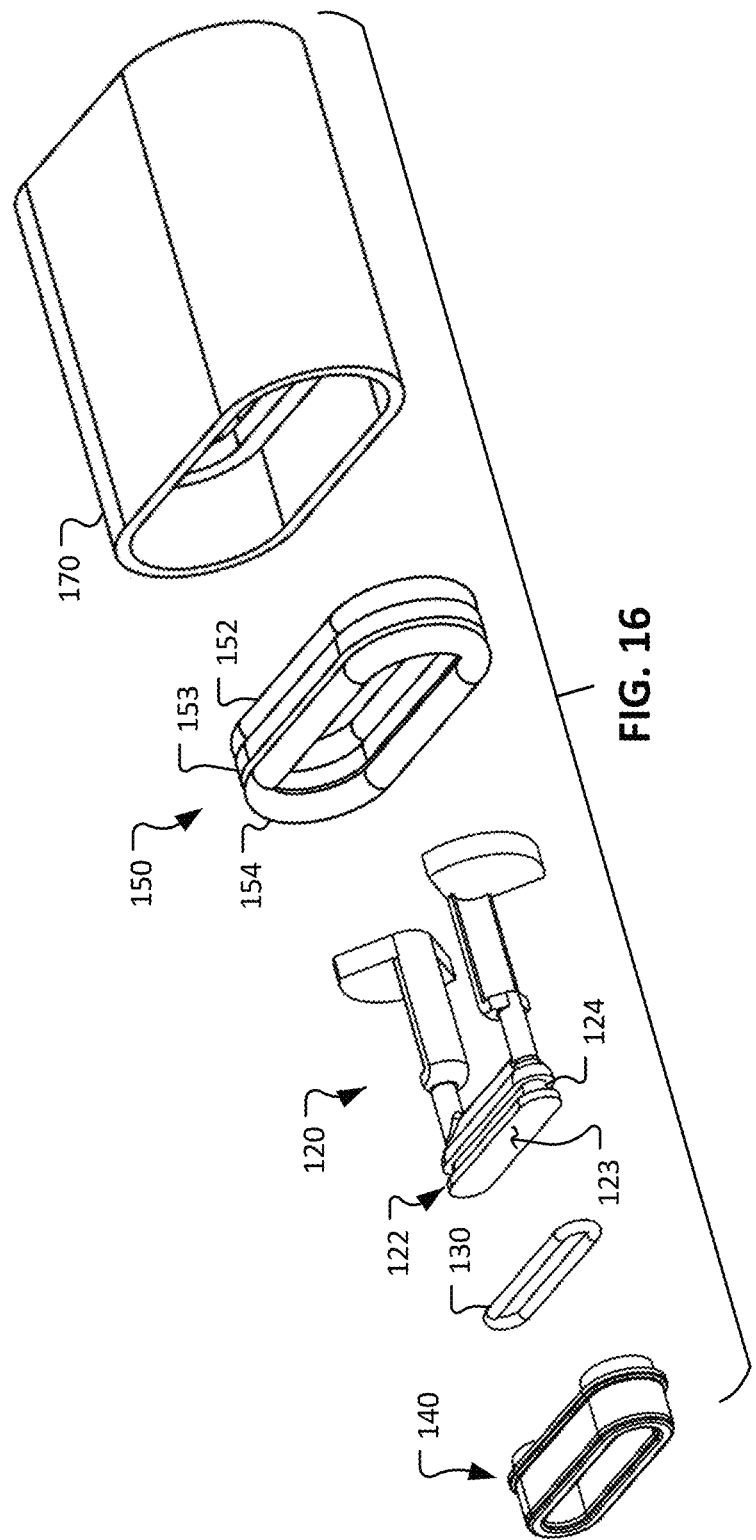

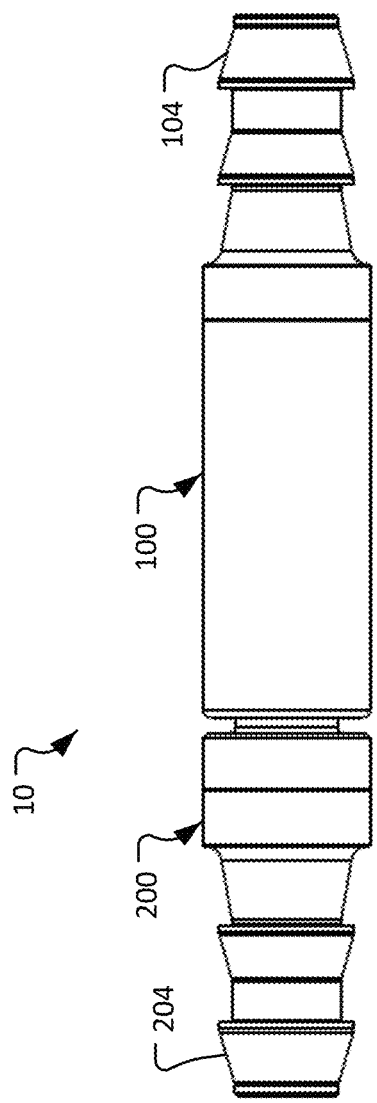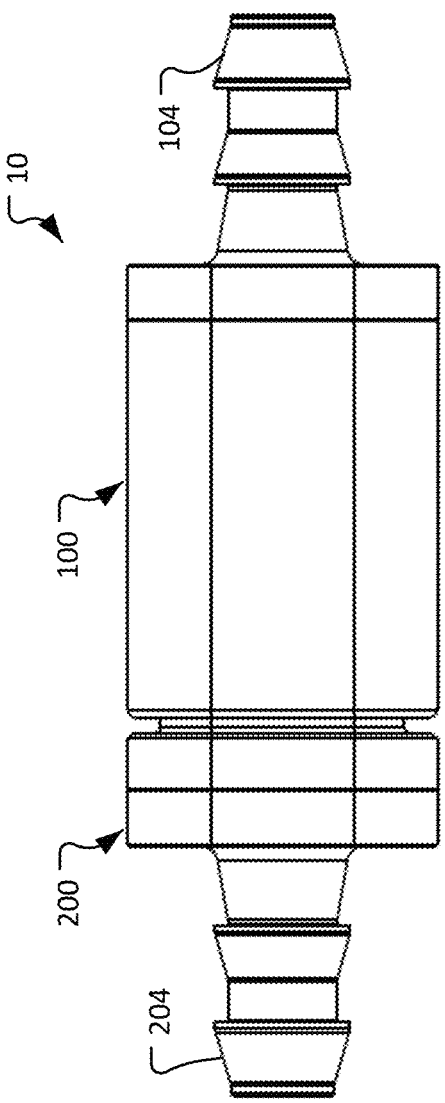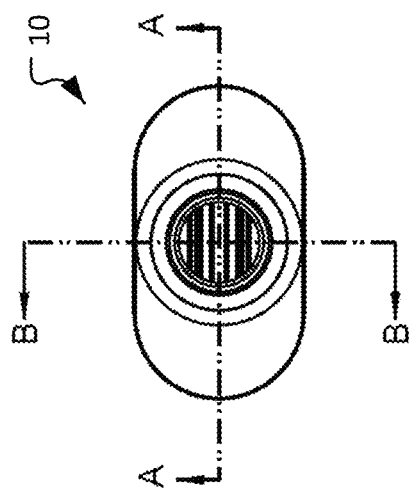

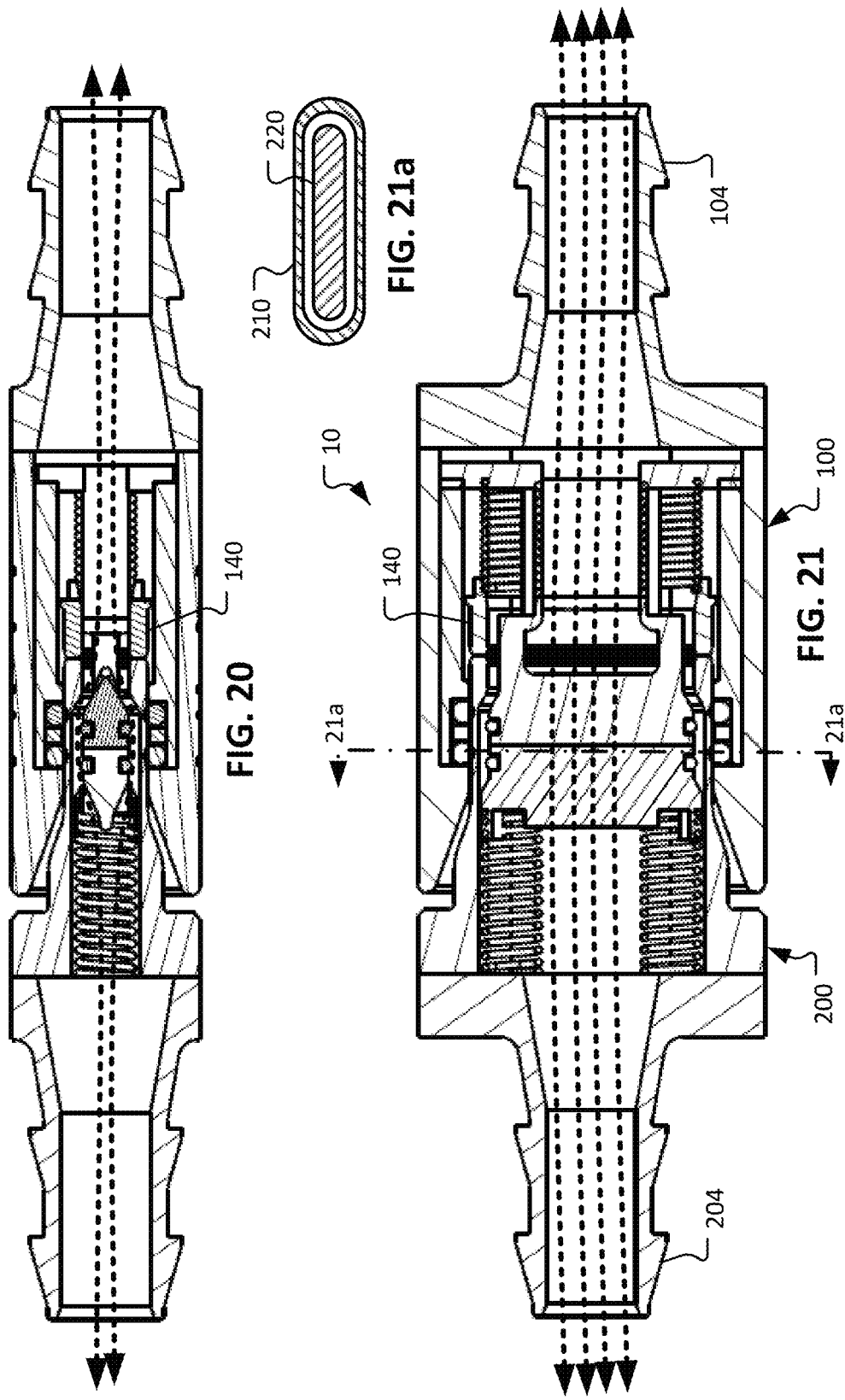

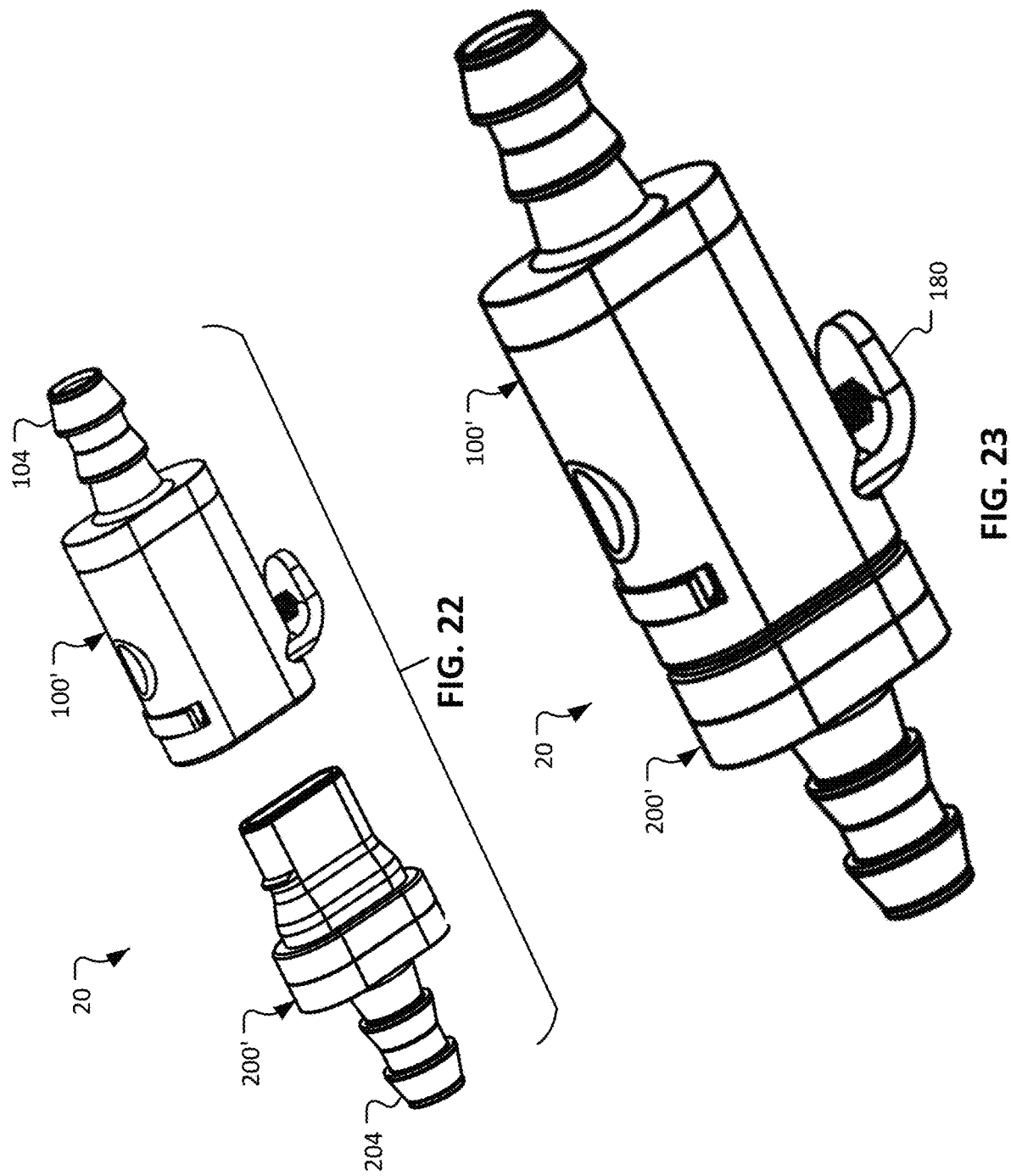

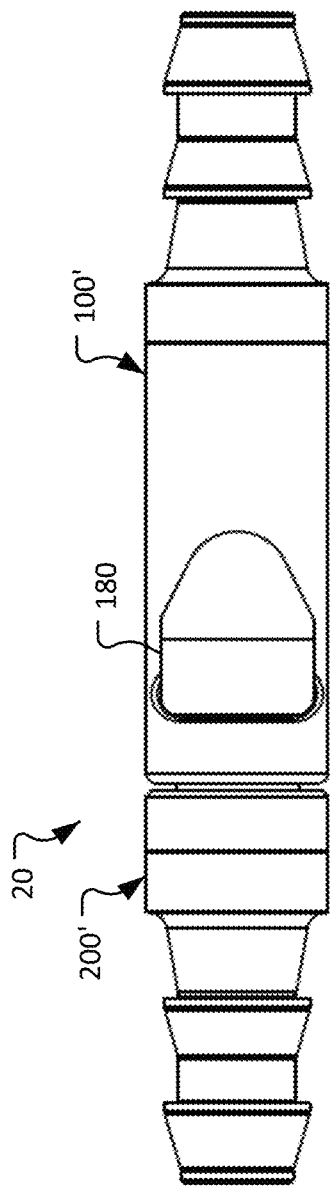
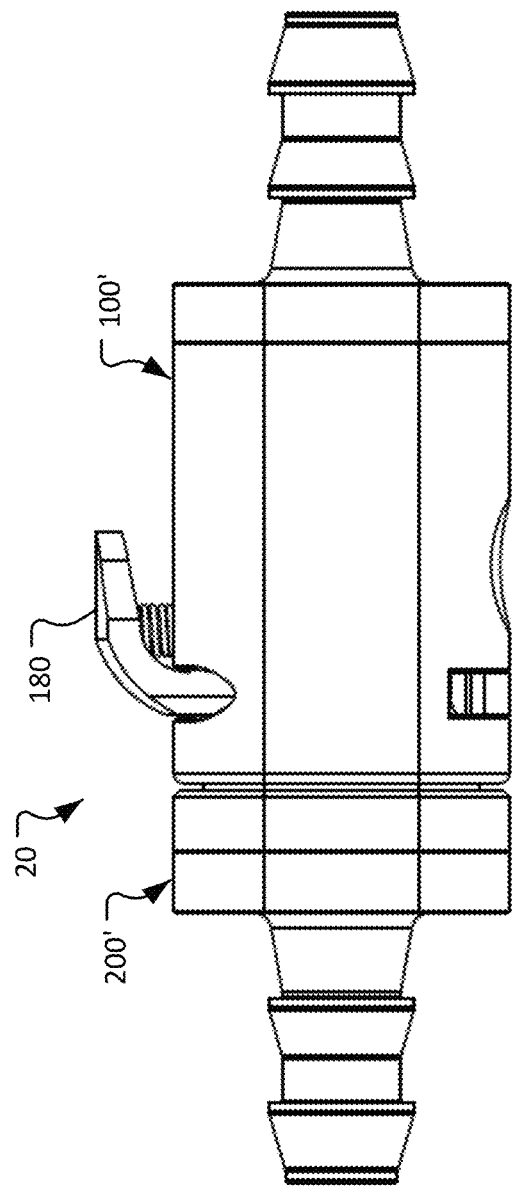
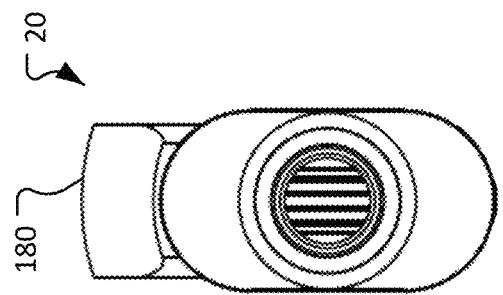

FLUID HANDLING COUPLINGS

CROSS-REFERENCE TO RELATED APPLICATIONS

This application is a continuation of U.S. application Ser. No. 17/509,412 (U.S. Pat. No. 11,480,280) filed on Oct. 25, 2021, which claims the benefit of U.S. Provisional Application Ser. No. 63/114,053, filed Nov. 16, 2020. The disclosure of the prior application is considered part of (and is incorporated by reference in) the disclosure of this application.

TECHNICAL FIELD

This document relates to fluid handling couplings. For example, this document relates to fluid couplings that are designed to prevent spillage of fluid when connecting and disconnecting the couplings.

BACKGROUND

Fluid handling components such as fluid couplings allow fluid communication between two or more components. Some fluid couplings include features that allow male and female components to be quickly connected or disconnected, and may include one or more internal valve components that selectively block or allow flow of fluid through the coupling.

SUMMARY

This document describes fluid handling couplings. For example, this document describes fluid couplings that are designed to prevent spillage of fluid when connecting and disconnecting the couplings. In some embodiments, the fluid couplings described herein include internal valve components. In some example embodiments, the internal valve components include two springs that are arranged to exert their spring forces in parallel with each other to bias a valve component to a normally closed position. Some embodiments include a single spring. In particular embodiments, the fluid couplings have oblong cross-sectional shapes.

In one aspect, this disclosure is directed to a fluid coupling system that includes a male coupling and a female coupling. The male coupling includes: (i) a male coupling body defining a male longitudinal axis and a male coupling internal space; (ii) a male valve member disposed within the male coupling internal space, wherein the male valve member is movable, parallel to the male longitudinal axis, relative to the male coupling body to open and close a flow path through the male coupling; and (iii) first and second male valve springs that each bias the male valve member to close the flow path through the male coupling. The first and second male valve springs are each laterally offset from the male longitudinal axis on opposite sides of the male longitudinal axis in relation to each other. The female coupling includes: (a) a female coupling body defining a female longitudinal axis and a female coupling internal space; (b) a valve assembly disposed within the female coupling internal space and comprising a valve stem head and a valve sleeve, wherein the valve sleeve is movable, along the female longitudinal axis, relative to the female coupling body and the valve stem head to open and close a flow path through the female coupling; and (c) first and second female valve springs that each bias the valve sleeve to close the flow path through the female coupling. The first and second female valve springs are each laterally offset from the female longitudinal axis on opposite sides of the female longitudinal axis in relation to each other.

Such a fluid coupling system may optionally include one or more of the following features. The male valve member may have a first oblong outer profile shape when viewed along the male longitudinal axis. The valve sleeve may have a second oblong outer profile shape when viewed along the female longitudinal axis. A front face of the male valve member may abuts against a front face of the valve stem head when the male coupling and the female coupling are coupled together. The front face of the male valve member and the front face of the valve stem head may each have a same oblong outer profile shape. The fluid coupling system may also include a latch that is movably coupled to the female coupling body and arranged to releasably engage against a protrusion of the male coupling body when the male coupling and the female coupling are coupled together.

In another aspect, this disclosure is directed to a male fluid coupling that includes a male coupling body defining a male longitudinal axis and a male coupling internal space, a male valve member disposed within the male coupling internal space, and first and second male valve springs that each bias the male valve member to close the flow path through the male coupling. The male valve member is movable, parallel to the male longitudinal axis, relative to the male coupling body to open and close a flow path through the male coupling. The first and second male valve springs are each laterally offset from the male longitudinal axis on opposite sides of the male longitudinal axis in relation to each other.

Such a male fluid coupling may optionally include one or more of the following features. The male valve member may have an oblong outer profile shape when viewed along the male longitudinal axis. The male fluid coupling internal space may have an oblong inner profile shape that corresponds to the oblong outer profile shape of the male valve member.

In another aspect, this disclosure is directed to a female fluid coupling that includes: a female coupling body defining a female longitudinal axis and a female coupling internal space; a valve assembly disposed within the female coupling internal space and comprising a valve stem head and a valve sleeve; and first and second female valve springs that each bias the valve sleeve to close the flow path through the female coupling. The valve sleeve is movable, along the female longitudinal axis, relative to the female coupling body and the valve stem head to open and close a flow path through the female coupling. The first and second female valve springs are each laterally offset from the female longitudinal axis on opposite sides of the female longitudinal axis in relation to each other.

Such a female fluid coupling may optionally include one or more of the following features. The valve sleeve may have an oblong outer profile shape when viewed along the female longitudinal axis. The valve stem head may have an oblong outer profile shape. The valve sleeve may define an oblong inner profile shape corresponding to the oblong outer profile shape of the valve stem head.

In another aspect, this disclosure is directed to a male fluid coupling comprising: (i) a male coupling body defining a male longitudinal axis and a male coupling internal space; and (ii) a male valve member disposed within the male coupling internal space. The male valve member is movable, parallel to the male longitudinal axis, relative to the male coupling body to open and close a flow path through the male coupling. The male valve member has an oblong outer profile shape when viewed along the male longitudinal axis.

Such a male fluid coupling may optionally include one or more of the following features. The male coupling internal space may have an oblong inner profile shape that corresponds to the oblong outer profile shape of the male valve member. The male fluid coupling may also include first and second male valve springs that each bias the male valve member to close the flow path through the male coupling. In some embodiments, the first and second male valve springs are each laterally offset from the male longitudinal axis on opposite sides of the male longitudinal axis in relation to each other.

In another aspect, this disclosure is directed to a female fluid coupling that includes (a) a female coupling body defining a female longitudinal axis and a female coupling internal space, (b) and a valve assembly disposed within the female coupling internal space and comprising a valve stem head and a valve sleeve. The valve sleeve is movable, along the female longitudinal axis, relative to the female coupling body and the valve stem head to open and close a flow path through the female coupling. The valve sleeve has an oblong outer profile shape when viewed along the female longitudinal axis.

Such a female fluid coupling may optionally include one or more of the following features. The valve stem head may have an oblong outer profile shape. The valve sleeve may define an oblong inner profile shape corresponding to the oblong outer profile shape of the valve stem head. The female fluid coupling may also include first and second female valve springs that each bias the valve sleeve to close the flow path through the female coupling. The first and second female valve springs may each be laterally offset from the female longitudinal axis on opposite sides of the female longitudinal axis in relation to each other. The female fluid coupling may also include a latch that is movably coupled to the female coupling body and movable transverse to the female longitudinal axis.

In another aspect, this disclosure is directed to a cartridge for use in a fluid handling component. The cartridge includes: (1) a cartridge housing defining an outer profile, an interior space, and a central longitudinal axis; (2) a valve stem within the interior space and including a valve stem head; (3) a valve sleeve movably disposed within the interior space along the central longitudinal axis between a first position in which a fluid flow path through the interior space is closed and a second position in which the fluid flow path is open, the valve sleeve defining an inner open space that receives the valve stem head when the valve sleeve is in the first position; (4) a first seal disposed between the valve sleeve and the valve stem head when the valve sleeve is in the first position; (5) a second seal disposed between the valve sleeve and the cartridge when the valve sleeve is in the first position; and (6) a third seal disposed within the interior space adjacent to an end of the valve sleeve when the valve sleeve is in the first position. The inner open space defined by the valve sleeve has an oblong cross-sectional shape when viewed along the central longitudinal axis.

In another aspect, this disclosure is directed to a cartridge for use in a fluid handling component. The cartridge includes: (i) a cartridge housing defining an outer profile, an interior space, and a central longitudinal axis; (ii) a valve assembly disposed within the interior space and comprising a valve stem head and a valve sleeve, wherein the valve sleeve is movable along the central longitudinal axis relative to the cartridge housing and the valve stem head to open and close a flow path through the cartridge; and (iii) first and second valve springs that each bias the valve sleeve to close the flow path through the cartridge, wherein the first and second valve springs are each laterally offset from the central longitudinal axis on opposite sides of the central longitudinal axis in relation to each other.

Some embodiments of the devices, systems and techniques described herein may provide one or more of the following advantages. First, the fluid couplings described herein are designed to prevent spillage or escape of fluid when initially connecting the couplings and when disconnecting the couplings after use. By preventing spillage, material loss, soiling, contamination of the environment around the fluid couplings, and costs associated with spillage may be reduced. Second, the fluid couplings described herein are designed to prevent the inclusion of air into the fluid, as can often result during the process of joining male and female couplings together. By preventing air inclusion, the fluid is maintained in its most desired state. Third, in some embodiments the fluid couplings described herein include internal shut-off valves to prevent fluid spillage. Fourth, some embodiments of the fluid couplings described herein have oblong transverse cross-sections (as opposed to conventional circular transverse cross-sections). The oblong transverse cross-sections enable a low-profile coupling that provides favorable fluid flow characteristics in terms of low levels of flow resistance and pressure drop. Fifth, the fluid couplings described herein are convenient to decouple from each other. For example, a latch component of the female coupling may simply be depressed and the male and female couplings can then be separated from each other.

The details of one or more implementations are set forth in the accompanying drawings and the description below. Other features and advantages will be apparent from the description and drawings, and from the claims.

BRIEF DESCRIPTION OF DRAWINGS

The present description is further provided with reference to the appended Figures, wherein like structure is referred to by like numerals throughout the several views, and wherein:

FIG. 1 is perspective view of an example fluid coupling system, with the male coupling and the female coupling in an uncoupled arrangement.

FIG. 2 is a perspective view of the fluid coupling system of FIG. 1 in a coupled arrangement.

FIG. 7 is a first longitudinal cross-sectional view of the male coupling of FIG. 1.

FIG. 8 is a second longitudinal cross-sectional view of the male coupling of FIG. 1.

FIG. 9 is a perspective view of a male valve member of the male coupling of FIG. 1.

FIG. 10 is a perspective view of a seal that resides in a seal groove of the male valve member of FIG. 9.

FIG. 11 is an end view of the female coupling of FIG. 1.

FIG. 12 is a side view of the female coupling of FIG. 1.

FIG. 13 is a top view of the female coupling of FIG. 1.

FIG. 16 is an exploded perspective view of a cartridge used in the female coupling of FIG. 1.

FIG. 17 is an end view of the fluid coupling system of FIG. 2.

FIG. 18 is a side view of the fluid coupling system of FIG. 2.

FIG. 19 is a top view of the fluid coupling system of FIG. 2.

FIG. 20 is a first longitudinal cross-section view of the fluid coupling system of FIG. 2.

FIG. 21 is a second longitudinal cross-section view of the fluid coupling system of FIG. 2.

FIG. 21a is a transverse cross-section view of the fluid coupling system of FIG. 21.

FIG. 22 is perspective view of another example fluid coupling system, with the male coupling and the female coupling in an uncoupled arrangement.

FIG. 23 is a perspective view of the fluid coupling system of FIG. 22 in a coupled arrangement.

FIG. 24 is a side view of the fluid coupling system of FIG. 23.

FIG. 25 is a top view of the fluid coupling system of FIG. 23.

FIG. 26 is an end view of the fluid coupling system of FIG. 23.

DETAILED DESCRIPTION OF ILLUSTRATIVE EMBODIMENTS

Figure 5:
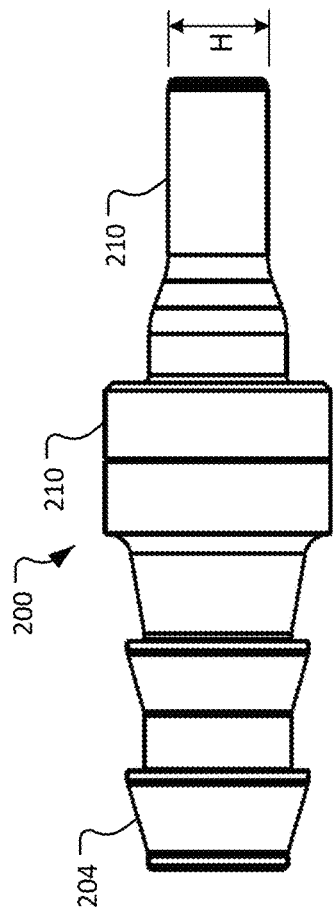
FIG. 5 is a side view the male coupling of FIG. 1.

This document describes fluid handling couplings. For example, this document describes fluid couplings that are designed to prevent spillage of fluid when connecting and disconnecting the couplings. In some embodiments, the fluid couplings described herein include internal valve components. In some example embodiments, the internal valve components include two springs that are arranged to exert their spring forces in parallel with each other to bias a valve component to a normally closed position. However, two springs are not required in all cases. Some embodiments include a single spring. In particular embodiments, components of the fluid couplings and fluid flow paths of the fluid couplings have oblong transverse cross-sectional shapes.

FIG. 1 provides a view of a fluid coupling system 10 in an uncoupled arrangement. The fluid coupling system 10 includes a female coupling 100 and a male coupling 200. The female coupling 100 and the male coupling 200 can be connected to establish a fluid flow path extending between a female coupling termination 104 and a male coupling termination 204, and thereafter disconnected (as shown) to close the fluid flow path (each of the female coupling 100 and the male coupling 200 closing the fluid flow path therethrough when uncoupled). Hence, the female coupling 100 and the male coupling 200 are releasably coupleable. In some embodiments, an actuatable latch is included to releasably detain the female coupling 100 and the male coupling 200 in a coupled configuration (e.g., see FIGS. 22-35). In the depicted embodiment, no such latch is included.

The fluid coupling system 10 is a non-spill coupling system. That is, as described further below, the coupling system 10 is designed so that no fluid will spill (or only a minimal amount of fluid will spill) from the female coupling 100 and the male coupling 200 when they are being connected to each other and when they are being disconnected from each other after use. As used herein, the term "fluid" means any substance that can be made to flow including, but not limited to, liquids, gases, granular or powdered solids, mixtures or emulsions of two or more fluids, suspensions of solids within liquids or gases, vapors, steam, etc.

Figure 6:
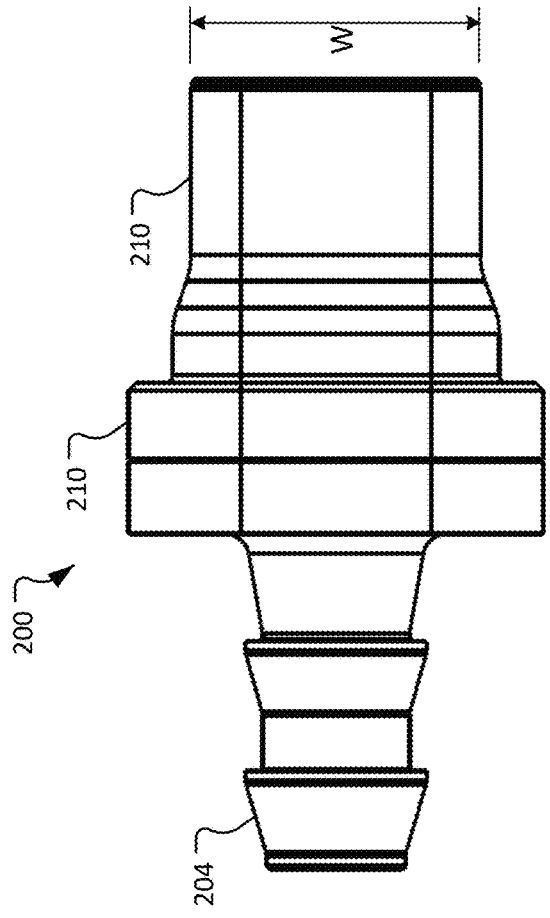
FIG. 6 is top view of the male coupling of FIG. 1.

To connect or couple the female coupling 100 and the male coupling 200, they are each first coaxially aligned with a central insertion axis 12. That is, the central longitudinal axes of the female coupling 100 and the male coupling 200 are arranged to coincide with the insertion axis 12. In addition, the longer width "W" of the female coupling 100 (as shown in FIG. 13) and the longer width "W" of the male coupling 200 (as shown in FIG. 6) are arranged in alignment with each other. Then the female coupling 100 and the male coupling 200 are longitudinally moved toward each other so that the leading end of the male coupling 200 is inserted into the open end of the female coupling 100. In the fully coupled arrangement, the female coupling 100 and the male coupling 200 are mechanically maintained in forced longitudinal engagement with each other, or are latched together.

FIG. 2 depicts the fluid coupling system 10 in the fully coupled arrangement. In this fully coupled arrangement, fluid can flow between the female coupling termination 104 and the male coupling termination 204 (along an open fluid flow path through the fluid coupling system 10). As described further below, the female coupling 100 and the male coupling 200 each include an internal valve that is open while the fluid coupling system 10 in the fully coupled arrangement, and closed while the fluid coupling system 10 in the uncoupled arrangement (FIG. 1). The process of connecting the female coupling 100 and the male coupling 200 causes the internal valves to open. Inversely, the process of disconnecting the female coupling 100 and the male coupling 200 causes (or allows) the internal valves to close. With the internal valves closed, fluid is shut off from being able to flow out of either/both of the female coupling 100 or the male coupling 200.

While the coupling terminations 104 and 204 are depicted as barbed fittings, any type of fluid connection can be used. For example, the coupling terminations 104 and/or 204 can be, but are not limited to, a compression fitting, a press-in fitting, a luer fitting, a threaded fitting (internal or external), a sanitary fitting, a pigtail, a T-fitting, a Y-fitting, and any other suitable type of configuration such that the female coupling 100 and male coupling 200 are compatible with, and configured for connection to, any type of fluid system as desired. In some embodiments, the female coupling 100 and/or male coupling 200 may be supplied with a removable cap (not shown), or another type of component, that is releasably coupled with the terminations 104 and/or 204. In some embodiments, no termination is included as a part of the female coupling 100 and/or the male coupling 200. In such a case, the female coupling 100 and/or the male coupling 200 may be configured to be integrated into another assembly such as a cold plate or a manifold, for example. In some embodiments, the female coupling 100 and/or male coupling 200 may be provided as sterile coupling members.

The materials from which one or more of the components of the female coupling 100 and/or male coupling 200 are made of include thermoplastics. In particular embodiments, the materials from which the components of the female coupling 100 and/or male coupling 200 are made of are thermoplastics, such as, but not limited to, acetal, ABS, polycarbonate, polysulfone, polyether ether ketone, polysulphide, polyester, polyvinylidene fluoride (PVDF), polyethylene, polyphenylsulfone (PPSU; e.g., Radel®), polyetherimide (PEI; e.g., Ultem®), polypropylene, polyphenylene, polyaryletherketone, and the like, and combinations thereof. In some embodiments, the components can also use include one or more fillers such as glass fiber, glass bead, carbon fiber, talc, etc.

In some embodiments, the materials from which one or more of the components of the female coupling 100 and/or male coupling 200 are made of include metals such as, but not limited to stainless steel, brass, aluminum, plated steel, zinc, and the like. In particular embodiments, the female coupling 100 and/or male coupling 200 is/are metallic-free. In some embodiments, the female coupling 100 and/or male coupling 200 include one or more metallic spring members (e.g., spring steel, stainless steel, and the like). In some embodiments, non-metallic springs, such as thermoplastic or thermoset can be used in addition to, or as an alternative to, metallic springs/parts.

In certain embodiments, female coupling 100 and/or male coupling 200 include one or more seals that are made of materials such as, but not limited to, silicone, fluoroelastomers (FKM), ethylene propylene diene monomer (EPDM), thermoplastic elastomers (TPE), buna, buna-N, thermoplastic vulcanizates (TPV), and the like. The cross-sectional shapes of the seals can be circular, D-shaped, X-shaped, square, rectangular, U-shaped, multi-lobed, L-shaped, V-shaped, and the like, without limitation.

FIGS. 3-6 show external views of the male coupling 200 in greater detail. The male coupling 200 includes a male coupling body 210. The male coupling termination 204 is attached to and extends from the male coupling body 210.

It can be seen that, in the depicted embodiment, the male coupling body 210 has an oblong outer profile. For example, the leading end of the male coupling body 210 (i.e., the end opposite of the termination 204, and which gets inserted into the female coupling 100) has a height "H" (FIG. 5) and a width "W" (FIG. 6). The width "W" is greater than the height "H." Accordingly, the transverse cross-sectional outer profile shape of the male coupling body 210 is oblong. As used herein, the term "oblong" can mean various shapes including, but not limited to, oval shape, elliptical, racetrack-shaped, D-shaped, egg-shaped, ovoid, rectangular, and the like. In some embodiments, the male coupling body 210 can include one or more physical features to "key" it to be inserted into the female coupling 100 in a particular, single orientation. In some embodiments, one or more visual markings can be included on the female coupling 100 and/or the male coupling 200 to facilitate such a "keying" functionality.

In some embodiments, the ratio of the height "H" to the width "W" is between 1:1 to 1:20, or between 1:1 to 1:16, or between 1:1 to 1:12, or between 1:1 to 1:10, or between 1:1 to 1:8, or between 1:1 to 1:6, or between 1:1 to 1:4, or between 1:1 to 1:2, or between 1:2 to 1:16, or between 1:2 to 1:12, or between 1:2 to 1:10, or between 1:2 to 1:8, or between 1:2 to 1:6, or between 1:2 to 1:4, or between 1:4 to 1:16, or between 1:4 to 1:12, or between 1:4 to 1:10, or between 1:4 to 1:8, or between 1:4 to 1:6, or between 1:6 to 1:16, or between 1:6 to 1:12, or between 1:6 to 1:10, or between 1:6 to 1:8, without limitation.

Figure 4:
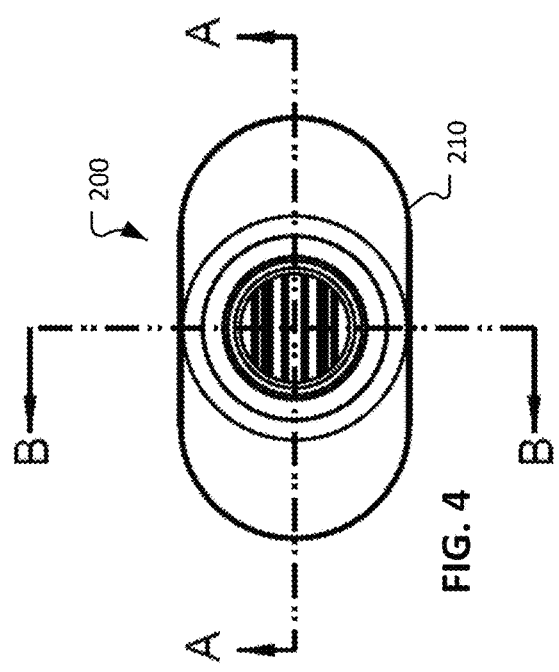
FIG. 4 is an end view of the male coupling of FIG. 1.

In addition, as best seen in FIG. 4, the male coupling 200 defines a central plane A-A along its width "W."

FIGS. 7 and 8 illustrate longitudinal cross-section views of the male coupling 200. The male coupling body 210 defines a male longitudinal axis 202 that extends centrally through the male coupling 200.

The male coupling body 210 defines an internal space 212. Within the internal space 212 of the example male coupling 200 are disposed a male valve member 220, a first male valve spring 230a, and a second male valve spring 230b. In some embodiments, the male coupling 200 includes a single spring. In some such embodiments, the single spring can be positioned concentric with the male longitudinal axis 202. The single spring can have a cylindrical outer profile or an oblong outer profile that corresponds to the outer profile of the male valve member 220.

The male valve member 220 is movable within the internal space 212, along the male longitudinal axis 202, parallel to the male longitudinal axis 202. In the depicted arrangement, the male valve member 220 is positioned to close off and seal a fluid flow path through the male coupling 200. In other words, even if the internal space 212 contained a pressurized fluid, the fluid would not be expelled from the male coupling 200 because the valve member 220 is fluidly sealing the internal space 212 (unless and until the male coupling 200 is coupled to the female coupling 100, in which case the valve member 220 is moved farther into the internal space 212 and no longer provides the fluid seal, as described elsewhere herein).

The first and second male valve springs 230a-b are arranged within the internal space 212 so as to bias (force) the male valve member 220 to its closed position (as depicted). When the male coupling 200 is coupled to the female coupling 100 the first and second male valve springs 230a-b become further compressed (shortened) as the male valve member 220 moves farther within the internal space 212.

The first and second male valve springs 230a-b are arranged in parallel within the internal space 212. Each of the first and second male valve springs 230a-b individually acts on the male valve member 220. Both of the first and second male valve springs 230a-b become shortened by the same amount when the male valve member 220 moves farther within the internal space 212.

Neither of the first and second male valve springs 230a-b are positioned coaxially with the male longitudinal axis 202. Instead, each of the first and second male valve springs 230a-b are laterally offset from the male longitudinal axis 202. Moreover, in the depicted embodiment the first and second male valve springs 230a-b are each laterally offset from the male longitudinal axis 202 on opposite sides of the male longitudinal axis 202 in relation to each other. In the depicted embodiment, the first and second male valve springs 230a-b are each laterally offset from the male longitudinal axis 202 by 180° on opposite sides of the male longitudinal axis 202 in relation to each other. Neither of the first and second male valve springs 230a-b even intersect with the male longitudinal axis 202. Instead, each of the first and second male valve springs 230a-b are spaced laterally apart from the male longitudinal axis 202.

FIG. 9 shows the male valve member 220 in isolation. It can be seen that the outer profile shape of the male valve member 220 is oblong (e.g., when viewed along the male longitudinal axis 202).

Figure 3:
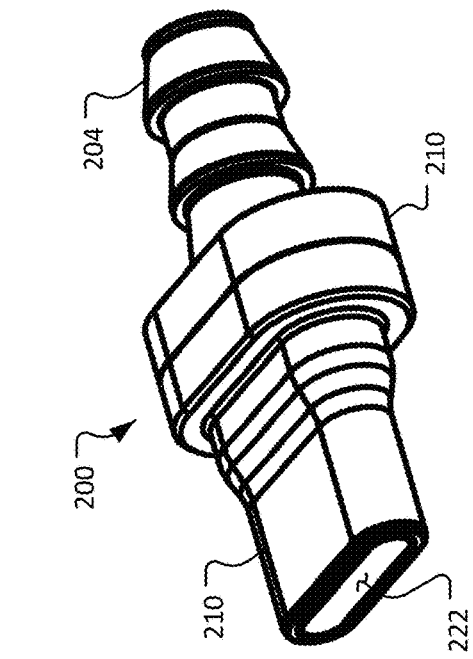
FIG. 3 is a perspective view of the male coupling of FIG. 1.

The male valve member 220 has a front face 222 (see also FIG. 3). The front face 222 is oblong shaped (e.g., when viewed along the male longitudinal axis 202). Accordingly, the front face has a width and a height (analogous to that of the male coupling body 210 described above). In some embodiments, the ratio of the height to the width of the front face 222 of the male valve member 220 is between 1:1 to 1:20, or between 1:1 to 1:16, or between 1:1 to 1:12, or between 1:1 to 1:10, or between 1:1 to 1:8, or between 1:1 to 1:6, or between 1:1 to 1:4, or between 1:1 to 1:2, or between 1:2 to 1:16, or between 1:2 to 1:12, or between 1:2 to 1:10, or between 1:2 to 1:8, or between 1:2 to 1:6, or between 1:2 to 1:4, or between 1:4 to 1:16, or between 1:4 to 1:12, or between 1:4 to 1:10, or between 1:4 to 1:8, or between 1:4 to 1:6, or between 1:6 to 1:16, or between 1:6 to 1:12, or between 1:6 to 1:10, or between 1:6 to 1:8, without limitation.

The male valve member 220 defines a seal recess 224. The seal recess 224 is sized to receive an elastomeric seal 240 as depicted in FIG. 10. In some embodiments, the seal 240 is naturally oblong shaped. The seal 240 creates a fluid tight seal between the male valve member 220 and the male coupling body 210 when the male valve member 220 is in the closed position (e.g., as shown in FIGS. 7 and 8).

The male valve member 220 includes two side members 226. The side members 226 slide along the inner wall of the male coupling body 210 as the male valve member 220 moves within the internal space 212 of the male coupling 200. In the depicted embodiment, the side members 226 block fluid flow when the male valve member 220 is in its open position (in other words, the fluid flowing past the male valve member 220 flows in the spaces between the two side members 226). However, alternatively in some embodiments the two side members 226 can be configured to allow fluid flow, rather than to block fluid flow. For example, in some embodiments one or more longitudinally-extending grooves can be defined in the outer surfaces of the side members 226.

FIGS. 11-13 show external views of the female coupling 100 in greater detail. The female coupling 100 includes a female coupling body 110. The female coupling termination 104 is attached to and extends from the female coupling body 110. It can be seen that the female coupling 100 has an outer profile shape that is oblong (e.g., see FIG. 11). In addition, as best seen in FIG. 11, the female coupling 100 defines a central plane A-A along its width "W."

Figure 14:
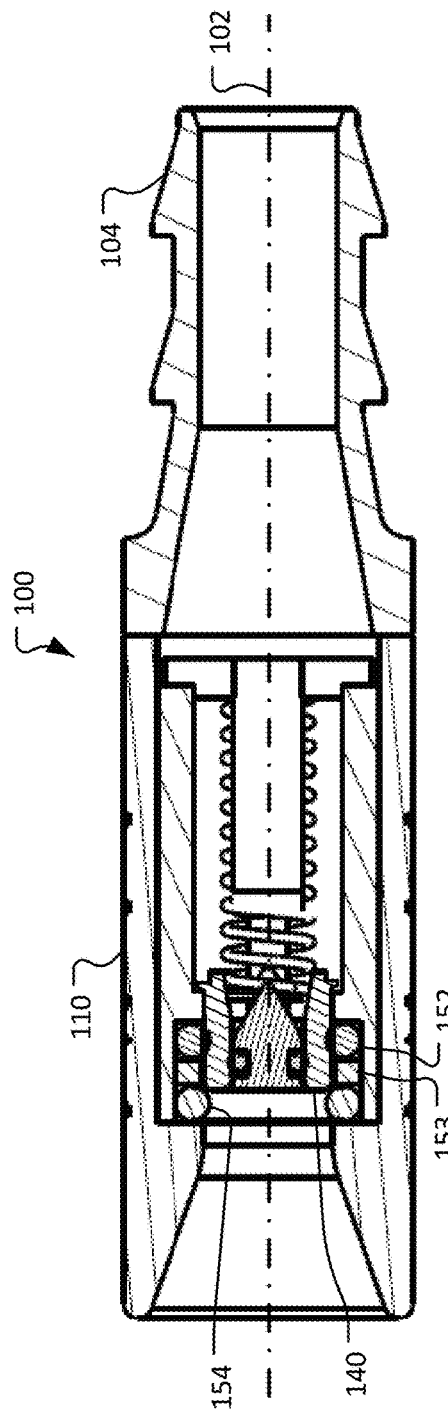
FIG. 14 is a first longitudinal cross-section view of the female coupling of FIG. 1.
Figure 15:
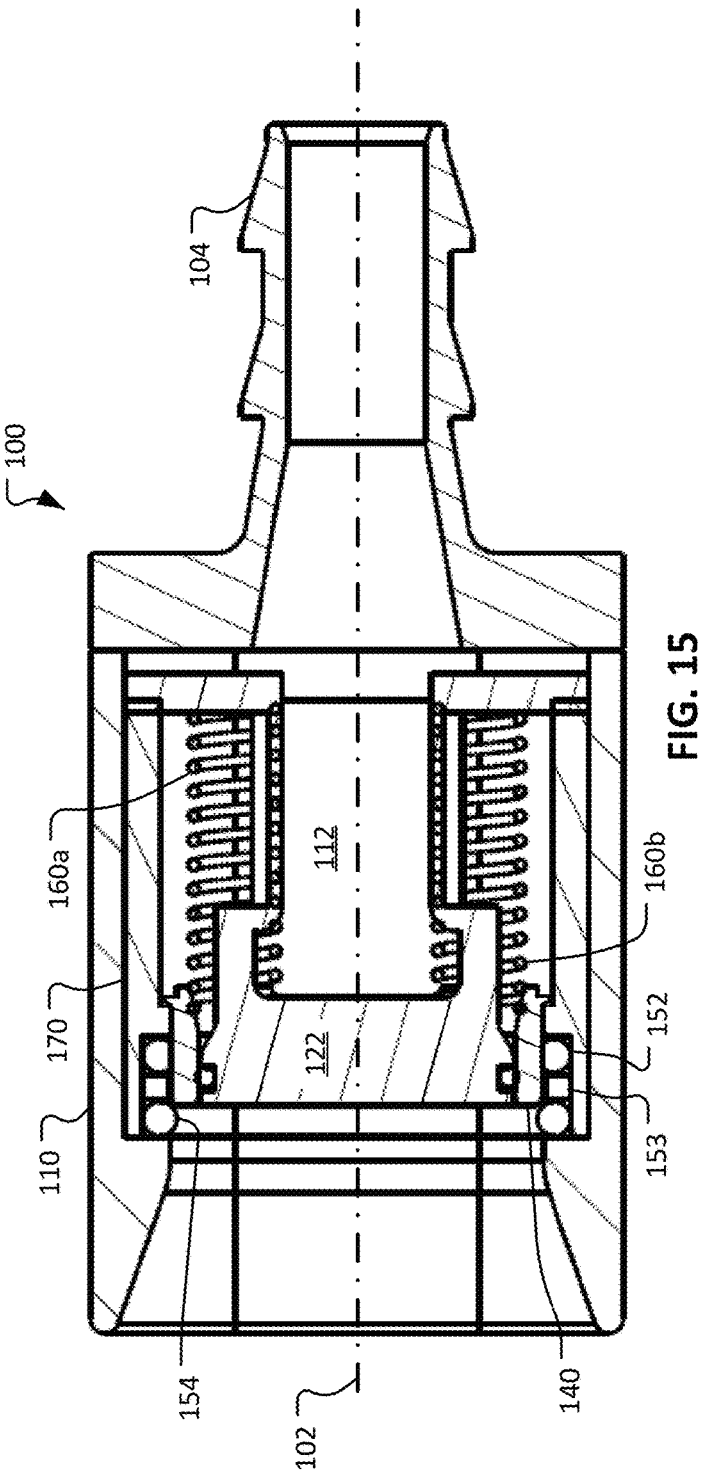
FIG. 15 is a second longitudinal cross-section view of the female coupling of FIG. 1.

FIGS. 14 and 15 illustrate longitudinal cross-section views of the female coupling 100. The female coupling body 110 defines a female longitudinal axis 102 that extends centrally through the female coupling 100.

The female coupling body 110 defines an internal space 112. Within the internal space 112 are components that make up a valve assembly.

Referring also to FIG. 16, the components that make up the valve assembly within the internal space 112 of the female coupling body 110 include a valve stem 120, a seal 130, a valve sleeve 140, a seal assembly 150, a first female valve spring 160a, and a second female valve spring 160b. The valve springs 160a-b are not shown in FIG. 16 (refer, for example, to FIGS. 14 and 15).

The valve sleeve 140 is movable within the internal space 112, along the female longitudinal axis 102 and parallel to the female longitudinal axis 102. In the depicted arrangement, the valve sleeve 140 is positioned to close off and seal a fluid flow path through the female coupling 100. In other words, even if the internal space 112 contained a pressurized fluid, the fluid would not be expelled from the female coupling 100 because the valve sleeve 140 is fluidly sealing the internal space 112 (unless and until the female coupling 100 is coupled to the male coupling 200, in which case the valve sleeve 140 is moved farther into the internal space 112 and no longer provides the fluid seal, as described elsewhere herein).

The first and second female valve springs 160a-b are arranged within the internal space 112 so as to bias (force) the valve sleeve 140 to its closed position (as depicted). When the female coupling 100 is coupled to the male coupling 200 the first and second female valve springs 160a-b become further compressed (shortened) as the valve sleeve 140 moves farther within the internal space 112.

The first and second female valve springs 160a-b are arranged in parallel within the internal space 112. Each of the first and second female valve springs 160a-b individually acts on the valve sleeve 140. Both of the first and second female valve springs 160a-b become shortened by the same amount when the valve sleeve 140 moves farther within the internal space 112.

Neither of the first and second female valve springs 160a-b are positioned coaxially with the female longitudinal axis 102. Instead, each of the first and second female valve springs 160a-b are laterally offset from the female longitudinal axis 102. Moreover, in the depicted embodiment the first and second female valve springs 160a-b are each laterally offset from the female longitudinal axis 102 on opposite sides of the female longitudinal axis 102 in relation to each other. In the depicted embodiment, the first and second female valve springs 160a-b are each laterally offset from the female longitudinal axis 102 by 180° on opposite sides of the female longitudinal axis 102 in relation to each other. Neither of the first and second female valve springs 160a-b even intersect with the female longitudinal axis 102. Instead, each of the first and second female valve springs 160a-b are spaced laterally apart from the female longitudinal axis 102.

In some embodiments, such as the depicted embodiment, the components that make up the valve assembly of the female coupling 100 are disposed within a cartridge housing 170. The cartridge housing 170, in turn, is disposed and sealed within the internal space 112 defined by the female coupling body 110. The combination of the cartridge housing 170 with the internal components that make up the valve assembly (as depicted in FIG. 16) can be used as a universal platform within various types of fluid handling devices, with differing form factors. It should be understood that the cartridge housing 170 is not required in all embodiments. Instead, the components that make up the valve assembly of the female coupling 100 can be disposed within the female coupling body 110 without a cartridge housing 170.

The valve stem 120 includes a valve stem head 122. The valve stem head 122 has a front face 123 and defines a seal recess 124. The seal 130 is received within the seal recess 124. The seal 130 provides a fluid seal between the valve stem head 122 and the valve sleeve 140 when the valve sleeve 140 is in the closed position (as shown in FIGS. 14 and 15). In an alternative arrangement, the seal member between the valve stem head 122 and the valve sleeve 140 can be located within the valve sleeve 140.

The seal assembly 150 includes a first seal 152, a spacer 153, and a second seal 154. The spacer 153 is disposed between the first seal 152 and the second seal 154. The first seal 152 provides a fluid seal between the valve sleeve 140 and the inner wall of the cartridge housing 170. The second seal 154 provides a fluid seal between the inner wall of the cartridge housing 170 and the male coupling body 210 when the male coupling 200 is inserted into the female coupling 100 in preparation for coupling the two together.

The fluid seal that is provided by the second seal 154 between the inner wall of the cartridge housing 170 and the male coupling body 210 when the male coupling 200 is inserted into the female coupling 100 is created prior to either of the valves of the female coupling 100 and the male coupling 200 becoming opened. Moreover, the front face 222 of the male valve member 220 abuts against the front face 123 of the valve stem head 122 without space for air or other fluids therebetween. The shapes and sizes of the front face 222 of the male valve member 220 and the front face 123 of the valve stem head 122 are equivalent. Accordingly, air inclusion and fluid spillage is eliminated or minimized during coupling. Also, when uncoupling the female coupling 100 from the male coupling 200, the valves of each close prior to the elimination of the fluid seal provided by the second seal 154 between the inner wall of the cartridge housing 170 and the male coupling body 210. Accordingly, fluid spillage is eliminated or minimized during uncoupling.

Still referring to FIGS. 14-16, many of the components of the female coupling 100 have an oblong shape (where the width is greater than the height when viewed along the female longitudinal axis 102). For example, the valve sleeve 140 has an oblong outer profile and defines an oblong inner open space. In some embodiments, the oblong outer profile of the valve sleeve 140 matches an oblong outer profile of the leading end portion of the male coupling body 210 (the end portion that is opposite of the termination 204). The oblong inner open space defined by the valve sleeve 140 matches an oblong outer profile of the valve stem head 122 (with the seal 130 therebetween). The cartridge housing 170 also defines an oblong inner space and an oblong outer profile. For all such components of the female coupling 100 having an oblong shape, the ratio of the height to the width of the oblong shape can be between 1:1 to 1:20, or between 1:1 to 1:16, or between 1:1 to 1:12, or between 1:1 to 1:10, or between 1:1 to 1:8, or between 1:1 to 1:6, or between 1:1 to 1:4, or between 1:1 to 1:2, or between 1:2 to 1:16, or between 1:2 to 1:12, or between 1:2 to 1:10, or between 1:2 to 1:8, or between 1:2 to 1:6, or between 1:2 to 1:4, or between 1:4 to 1:16, or between 1:4 to 1:12, or between 1:4 to 1:10, or between 1:4 to 1:8, or between 1:4 to 1:6, or between 1:6 to 1:16, or between 1:6 to 1:12, or between 1:6 to 1:10, or between 1:6 to 1:8, without limitation.

FIGS. 17-19 show additional views of the fluid coupling system 10 that includes the female coupling 100 and the male coupling 200 in the fully coupled, operative configuration. In this configuration, an open fluid flow path exists from the female coupling termination 104 to the male coupling termination 204. These views also show how the female coupling 100 and the male coupling 200 are each oblong shaped (when cross-sections are taken transverse to the fluid flow path between the terminations 104 and 204). For example, the end view of FIG. 17 clearly shows such an oblong shape. Again, as used herein, the term "oblong" can mean various shapes including, but not limited to, oval shape, elliptical, racetrack-shaped, D-shaped, egg-shaped, ovoid, rectangular, and the like.

FIGS. 20 and 21 illustrate longitudinal cross-section views of the fluid coupling system 10 when the female coupling 100 and the male coupling 200 are fully coupled with each other. The dashed lines illustrate the open fluid flow path that is created between the female coupling termination 104 and the male coupling termination 204.

To open the fluid flow path the following movements take place as the male coupling 200 is inserted into the female coupling 100. The front face 123 of the valve stem head 122 abuts against the front face 222 of the male valve member 220, and the male valve member 220 is thereby forced into the internal space 212 of the male coupling body 210. This compresses the first and second male valve springs 230a-b and opens the male coupling 200 for fluid flow. FIG. 21a shows the open fluid flow path area taken at a transverse cross-section (at cut-plane 21a-21a in FIG. 21) that is created between the male coupling body 210 and the male valve member 220. It can be seen that the open fluid flow path area is oblong shaped (e.g., like a racetrack in this example).

Also, as the male coupling 200 is inserted into the female coupling 100, the face of the leading end of the male coupling body 210 abuts against the valve sleeve 140, and the valve sleeve 140 is thereby forced into the internal space 112 of the female coupling body 110 and/or the cartridge housing 170. This compresses the first and second female valve springs 160a-b and opens the female coupling 100 for fluid flow. The shape of the open fluid flow path area in the female coupling 100 is oblong shaped (e.g., like what is shown in FIG. 21a).

Figure 27:
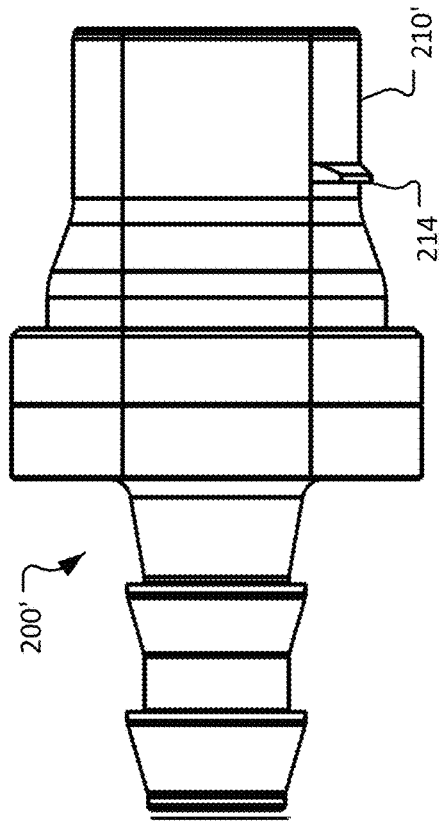
FIG. 27 is a top view of the male coupling of FIG. 22.
Figure 28:
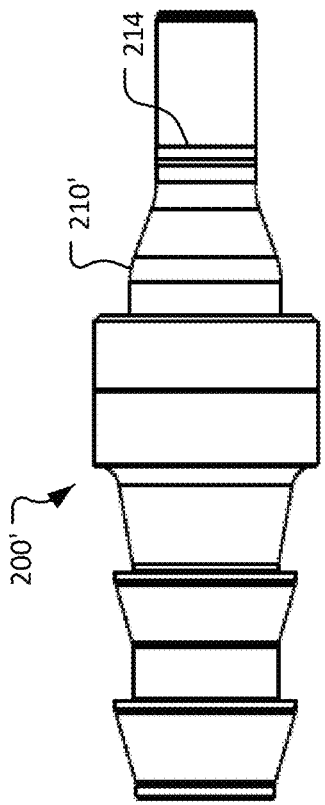
FIG. 28 is a side view of the male coupling of FIG. 22.
Figure 29:
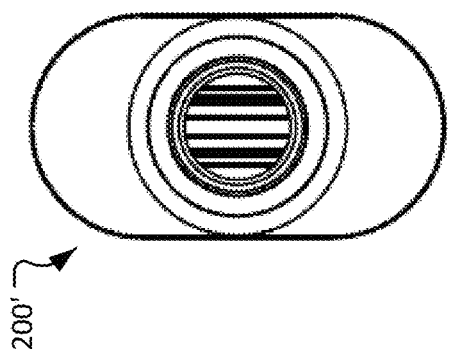
FIG. 29 is an end view of the male coupling of FIG. 22.
Figure 30:
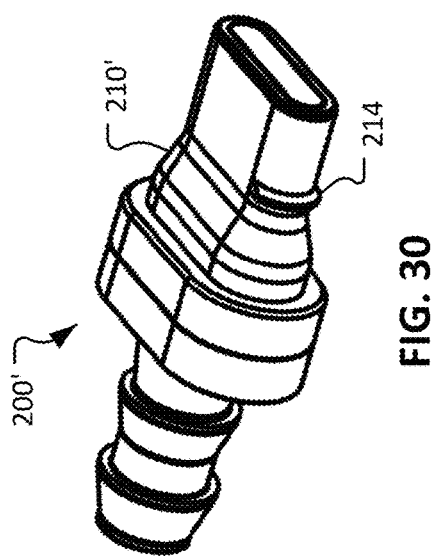
FIG. 30 is a perspective view of the male coupling of FIG. 22.
Figure 31:
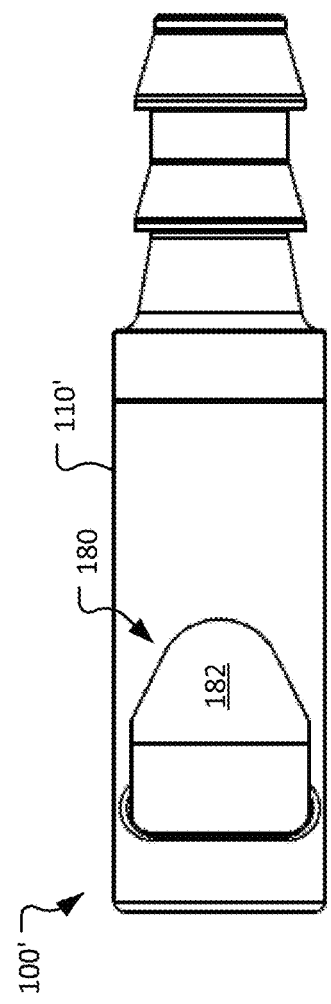
FIG. 31 is a side view of the female coupling of FIG. 22.
Figure 32:
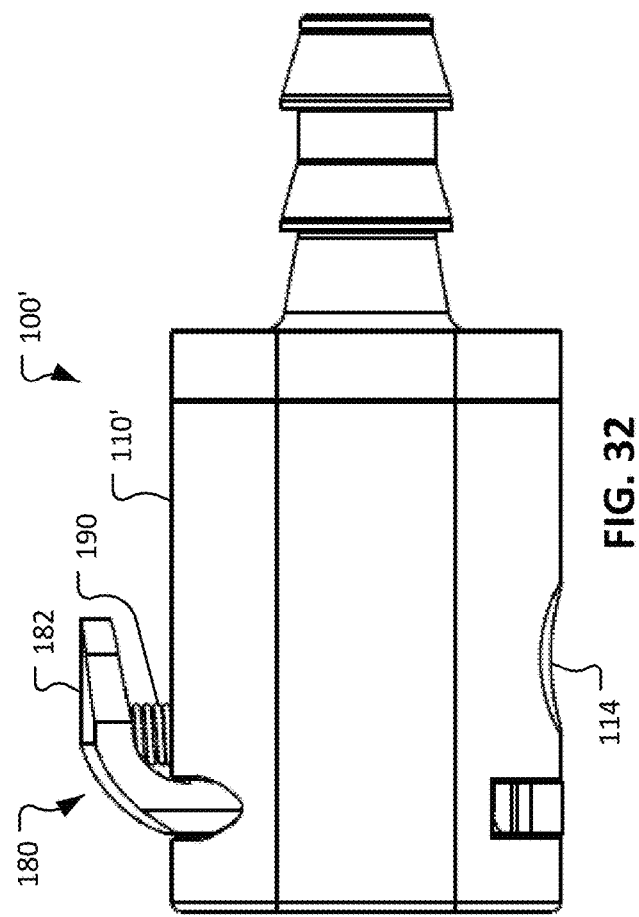
FIG. 32 is a top view of the female coupling of FIG. 22.
Figure 34:
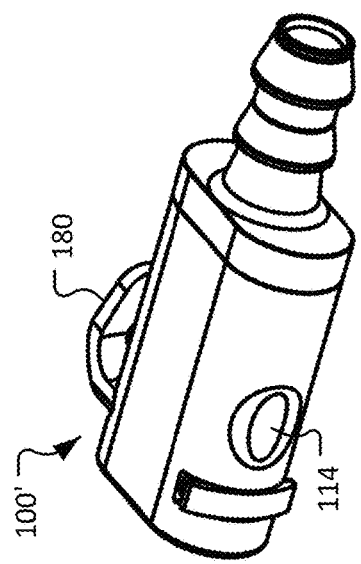
FIG. 34 is perspective view of the female coupling of FIG. 22.
Figure 33:
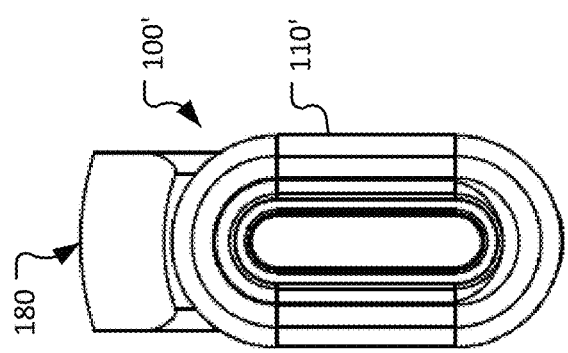
FIG. 33 is an end view of the female coupling of FIG. 22.
Figure 35:
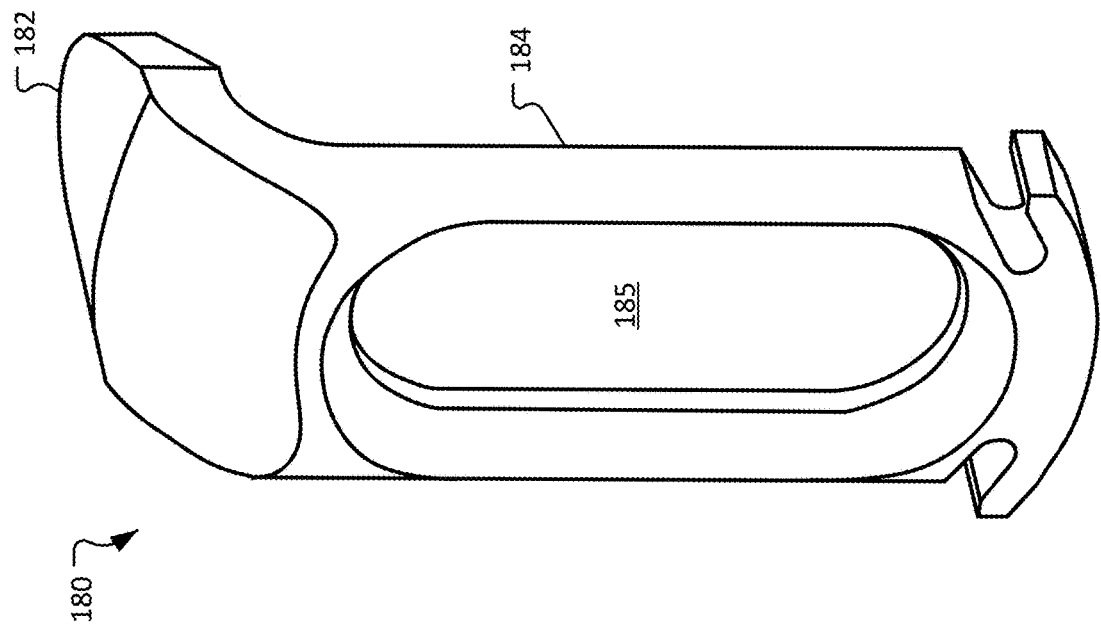
FIG. 35 is a perspective view of a clip of the female coupling of FIG. 22.

FIGS. 22-26 illustrate a fluid coupling system 20. The fluid coupling system 20 includes a female coupling 100' and a male coupling 200'. The female coupling 100' is a variation of the female coupling 100 described above, and the male coupling 200' is a variation of the male coupling 200 described above. The variation is that the female coupling 100' and the male coupling 200' can be latched together (releasably detained or coupled together) in the fully coupled arrangement (as shown). To accomplish this, the female coupling 100' includes a latch 180, and the male coupling 200' includes a corresponding latch element 214 (as shown in FIGS. 27, 28, and 30). Other than the latching functionality, the female coupling 100' and the male coupling 200' can be otherwise the same as the female coupling 100 and the male coupling 200 as described above.

FIGS. 27-30 show external views of the male coupling 200' in greater detail. The male coupling 200' includes a male coupling body 210'. The male coupling termination 204 is attached to and extends from the male coupling body 210'. Here, a latch element 214 is visible. The latch element 214 is a part of the male coupling body 210'. In this example, the latch element 214 is a protrusion that extends transversely outward from the male coupling body 210'. The leading side of the latch element 214 includes a beveled surface. The trailing side of the latch element 214 is a surface that extends perpendicularly from the male coupling body 210'. While the latch element 214 in the depicted embodiment extends from a single side of the male coupling body 210', in some embodiments a second latch element 214 that extends from the opposite side of the male coupling body 210' is also included.

FIGS. 31-34 show external views of the female coupling 100' in greater detail. The female coupling 100' includes the latch 180. The latch 180 is also shown in isolation in FIG. 35. The latch 180 includes a thumb pad 182, and a latch body 184 that extends from the thumb pad 182. A spring 190 is positioned to push the thumb pad 182 laterally away from the female coupling body 110' to a latched position. In some embodiments, a spring (as an alternative to the spring 190) can be molded into the latch 180 or the female coupling body 110'.

The latch body 184 is movably positioned within the female coupling body 110'. The latch body 184 defines an oblong opening 185 (peripherally surrounded by a lead-in region) that the leading end portion of the male coupling body 210' is passed through when the female coupling 100' and the male coupling 200' are being coupled together. The physical interaction between the latch element 214 on the leading end portion of the male coupling body 210' and the oblong opening 185 causes the latch 180 to move (compressing the spring 190) to allow the latch element 214 to pass through the oblong opening 185 to become positioned on the far side of the oblong opening 185. Then, the spring 190 again pushes the latch 180 to rebound so that the latch element 214 is detained on the far side of the oblong opening 185.

In the fully coupled arrangement as shown in FIGS. 23-26, the female coupling 100' and the male coupling 200' are mechanically latched or detained together. In order to uncouple the female coupling 100' and the male coupling 200', first the latch 180 is manually depressed (transversely to the longitudinal axes of the female coupling 100' and the male coupling 200'). Depressing the latch 180 will release the mechanical detainment between the female coupling 100' and the male coupling 200'. Then the female coupling 100' and the male coupling 200' can be disconnected or separated from each other (uncoupled). The internal valve springs of the female coupling 100' and the male coupling 200' may tend to naturally push the female coupling 100' and the male coupling 200' apart from each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Although a number of implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A fluid handling cartridge, comprising:
   a cartridge housing defining a central longitudinal axis and a housing internal space; and
   a valve assembly disposed within the housing internal space, the valve assembly comprising: (i) a valve stem comprising a valve stem head and a valve stem head support structure attached to the valve stem head and extending longitudinally to the cartridge housing and (ii) a valve sleeve,
   wherein the valve sleeve is movable, along the central longitudinal axis, relative to the valve stem head and the valve stem head support structure between: (a) an open position in which a flow path is defined through the fluid handling cartridge and (b) a closed position in which the flow path is blocked,
   wherein the valve sleeve has an oblong outer profile shape that extends around the valve stem head when the valve sleeve is in the closed position and that extends around the valve stem head support structure when the valve sleeve is in the open position, and
   wherein the central longitudinal axis intersects the valve stem head and does not intersect the valve stem head support structure.

2. The fluid handling cartridge of claim 1, wherein the valve stem head has an oblong outer profile shape.

3. The fluid handling cartridge of claim 2, wherein the valve sleeve defines an oblong inner profile shape corresponding to the oblong outer profile shape of the valve stem head.

4. The fluid handling cartridge of claim 2, further comprising an oblong seal member disposed between the valve stem head and the valve sleeve.

5. The fluid handling cartridge of claim 1, further comprising first and second valve springs that each bias the valve sleeve to the closed position.

6. The fluid handling cartridge of claim 5, wherein the first and second valve springs are each laterally offset from the central longitudinal axis on opposite sides of the central longitudinal axis in relation to each other.

7. The fluid handling cartridge of claim 1, further comprising one or more seals disposed within the cartridge housing and positioned to seal against a fluid coupling as it is inserted into the fluid handling cartridge.

8. The fluid handling cartridge of claim 7, wherein the one or more seals comprises a first seal and a second seal.

9. The fluid handling cartridge of claim 8, further comprising a spacer disposed between the first seal and the second seal.

10. The fluid handling cartridge of claim 9, wherein, when the valve sleeve is in the closed position, the first seal and the spacer are fully enclosed, and the second seal is at least partially exposed.

11. The fluid handling cartridge of claim 1, wherein the cartridge housing has an oblong inner profile shape.

12. The fluid handling cartridge of claim 11, wherein the cartridge housing has an oblong outer profile shape.

13. The fluid handling cartridge of claim 1, wherein the valve stem head support structure comprises a first longitudinally extending structural member and a second longitudinally extending structural member.

14. The fluid handling cartridge of claim 13, further comprising a first valve spring and a second valve spring that each bias the valve sleeve to the closed position.

15. The fluid handling cartridge of claim 14, wherein the first valve spring surrounds at least a portion of the first longitudinally extending structural member, and wherein the second valve spring surrounds at least a portion of the second longitudinally extending structural member.

16. The fluid handling cartridge of claim 1, wherein the valve stem head support structure is symmetrical about the central longitudinal axis.

17. The fluid handling cartridge of claim 1, wherein a cross-sectional area of the valve stem head is greater than a cross-sectional area of the valve stem head support structure.

* * * * *